W. C. FRANCIS.
TIRE ARMOR.
APPLICATION FILED MAR. 30, 1918.
1,300,946.
Patented Apr. 15, 1919.
2 SHEETS—SHEET 1.
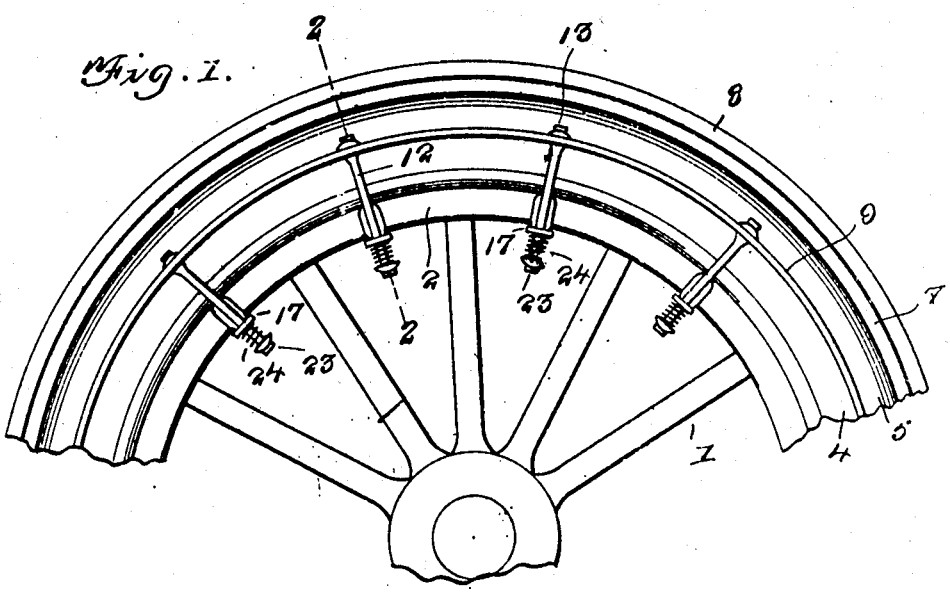
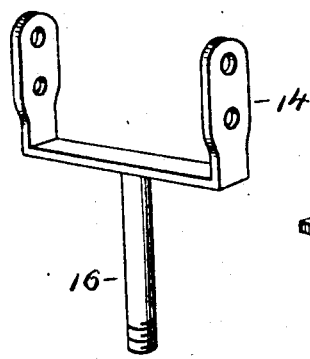
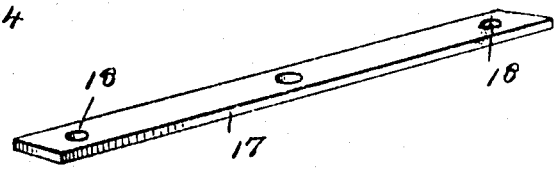
Inventor
W. C. Francis
By Victor J. Evans
Attorney
Witness
E. R. Ruppert W. C. FRANCIS.
TIRE ARMOR.
APPLICATION FILED MAR. 30, 1918.
1,300,946.
Patented Apr. 15, 1919.
2 SHEETS—SHEET 2.
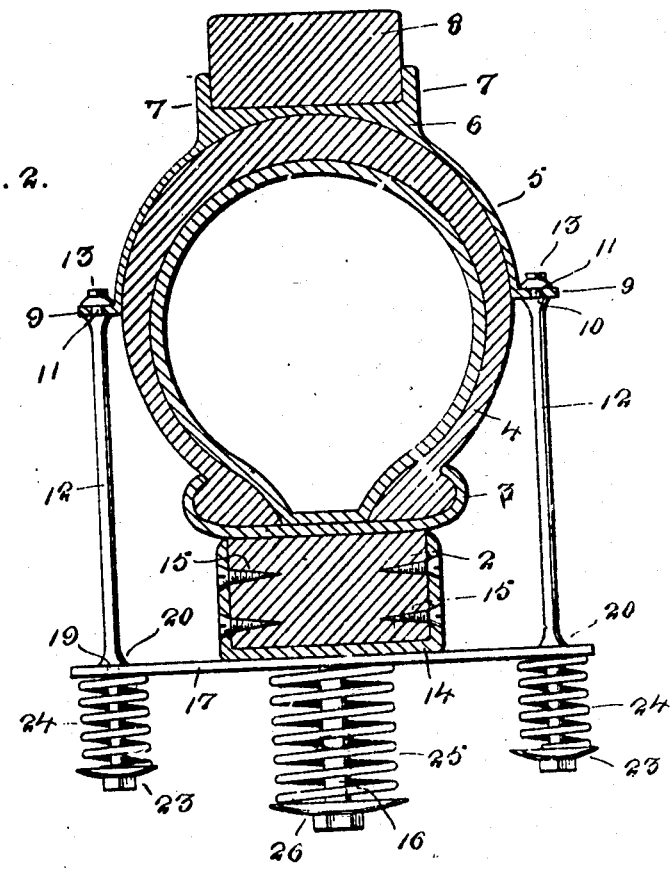
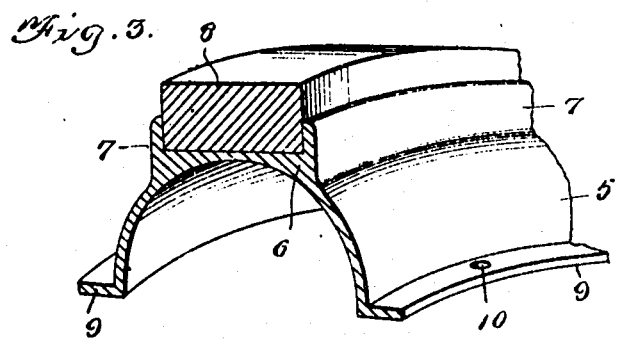
Inventor
W. C. Francis
Witness
E. R. Ruppert
By Victor J. Evans
Attorney

ABSTRACT# UNITED STATES PATENT OFFICE.

WALTER C. FRANCIS, OF CLARKSBURG, WEST VIRGINIA.

TIRE-ARMOR.

1,300,946.

Specification of Letters Patent.  Patented Apr. 15, 1919.

Application filed March 30, 1918. Serial No. 225,736.

*To all whom it may concern:*

Be it known that I, WALTER C. FRANCIS, a citizen of the United States, residing at Clarksburg, in the county of Harrison and State of West Virginia, have invented new and useful Improvements in Tire-Armors, of which the following is a specification.

This invention relates to a pneumatic tire attachment designed to serve as a protector for such tires as well as to assist in absorbing any shock or jar to which the wheel carrying the tire may be subjected.

The invention further consists in the construction, combination and operative arrangement of parts set forth in the following description and falling within the scope of what is claimed.

In the drawings,

Figure 1 is a side elevation of a vehicle wheel provided with my improvement.

Fig. 2 is a greatly enlarged sectional view approximately on the line 2—2 of Fig. 1.

Fig. 3 is a detail perspective view of a portion of the metal protector band.

Fig. 4 is a perspective view of the yoke member employed.

Fig. 5 is a perspective view of one of the plates loosely associated with the yoke.

Referring now to the drawings in detail the numeral 1 designates an ordinary vehicle wheel having on its felly 2 the usual rim 3 engaging the pneumatic tire 4.

My improvement contemplates the employment of a metal band 5 semicircular in cross section which entirely surrounds the tire 4. The band 5 is centrally formed, upon its outer face with a thickened portion 6 having its edges formed with outstanding continuous flanges 7, and between these flanges is arranged a solid rubber tread 8.

The band 5 has its edges formed with outstanding flanges 9 provided, at spaced intervals with openings 10. Through these openings pass the reduced ends 11 of rod members 12, each of the said reduced ends 11 being threaded and being engaged by a cap nut 13 which contacts with the outer surface of the flanges 9. The shoulder at the reduced end 11 contacts with the inner surface of the flanges 9, so that the rod members 12 are rigidly connected with the band 5.

On the felly 2, at desired spaced intervals are arranged metallic yokes 14, the side members of the said yokes having openings through which pass securing elements 15, such as screws, which hold the yokes on the felly. Each of the yokes is disposed in alinement with the oppositely disposed pairs of rods 12, and each of the yokes is centrally provided with an inwardly directed threaded stem 16.

Loosely arranged on the stem 16 of each of the yokes 14 is a plate 17, the said plate projecting beyond the sides of the felly and being provided, adjacent its ends with openings 18 through which pass reduced threaded members 19 formed on the inner ends of the rods 12. The shoulders 20 provided by the reduced threaded extensions 19 of the rods contact with the outer faces of the plates 17, and on the members 19 are arranged cap nuts 23 which contact with helical springs 24 that surround the said extensions 19, exerting a pressure upon the said springs to force the same against the plates 17, and cause the said plates to contact with the shoulders 20 of the rods 12. Surrounding the stem 16 of each of the yokes 14 is a spring 25 of a greater strength than the springs 24, and screwed on the stem 16 of each of the yokes is a cap nut 26 which regulates the tension of the springs 25 and forces the plate 17 in contact with the outer straight face or surface of the yoke 14.

The circular band 5 is arranged on the tire 4 before the said tire has been fully inflated, and as the band surrounds the tire for approximately one-half the diameter thereof the tread surface of the tire will be fully protected thereby. The yokes being secured to the felly and being connected with the rods hold the band 5 from creeping around the tire. The springs 24 exert a pressure to force the band into contact with the tire, and the air in the tire forces the band outward therefrom, thus providing resilient compensating means between the tire and the band. The springs 25, which, as stated, are of a greater strength than the springs 24 exert a pressure against the plates 17 to force the same in the direction of the band 5, and consequently relieves the band from undue pressure upon the tire. Any shocks or jars to which the wheel will be subjected is absorbed or taken up by the springs, and it is believed that the simplicity and advantages of the construction will be fully understood without further detailed description. It is to be understood that the inner reduced ends 19 of the rods 12 pass freely through the openings 18 in the plate 17, so that a slight circumferential movement between the tire armor and the felly is thus provided.

Having thus described the invention, what I claim is:

In a protector for pneumatic tires, the combination with a wheel carrying such a tire, of spaced yokes surrounding the felly of the wheel and secured thereto, each of said yokes having a centrally threaded stem, plates each provided with a central opening and with openings adjacent the ends thereof and the central opening receiving the stems of the respective yokes, nuts on the stems, springs surrounding the stems and contacted by the nuts for adjusting the tension of the springs and for forcing the latter against the plate to cause the same to hug the inner periphery of the felly, a band semi-circular in cross section arranged on the tread surface of the tire, said band having its central portion thickened and provided with spaced outstanding flanges, a compressible tread between the flanges, the edges of the band having outstanding flanges which are apertured, rod members having reduced threaded ends extending through the openings in the plates and through the openings in the flanges, bolts on the nuts, springs on the ends of the rods passing through the plate and contacted by the nuts thereon for adjusting the tension of the said springs and for yieldably sustaining the rods on the plates.

In testimony whereof I affix my signature.

WALTER C. FRANCIS.